Dec. 5, 1944.  A. G. SCHURMAN  2,364,101
MILLING
Original Filed Nov. 4, 1937  5 Sheets-Sheet 1

Dec. 5, 1944.  A. G. SCHURMAN  2,364,101
MILLING
Original Filed Nov. 4, 1937   5 Sheets-Sheet 2

Inventor
Adolph G. Schurman
By Edwin S. Clarkson
Attorney

Dec. 5, 1944.  A. G. SCHURMAN  2,364,101
MILLING
Original Filed Nov. 4, 1937   5 Sheets-Sheet 3

Inventor
Adolph G. Schurman
By Edwin S. Clarkson
Attorney

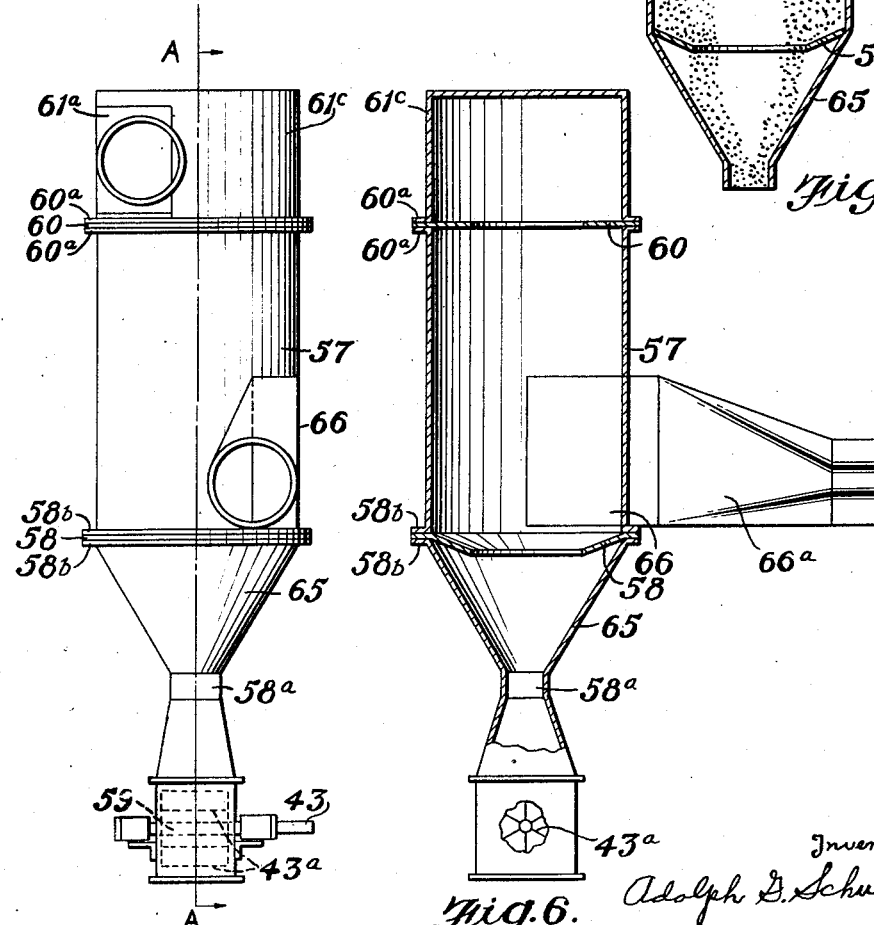

Patented Dec. 5, 1944

2,364,101

UNITED STATES PATENT OFFICE 2,364,101

MILLING

Adolph G. Schurman, Baltimore, Md.

Original application November 4, 1937, Serial No. 172,815. Divided and this application August 12, 1941, Serial No. 406,539

9 Claims. (Cl. 83—94)

This invention relates to milling and more particularly to the grinding and separation of material to be milled into finely powdered material.

This application is a division of my copending application Serial Number 172,815, filed November 4, 1937.

Prior to the instant invention, in the manufacture of finely powdered material, considerable trouble and loss of capacity or inefficiency has been experienced by the inability to remove the finished material from the grinding chamber rapidly enough to prevent the fine material from acting as a cushion so that the full force of the beaters within the grinding chamber can act on the material to be ground, and the inability to separate the finished fine material from the coarse in such a manner as to effect a finished product of uniform quality.

In fine pulverizing it has been customary to pass the material to be pulverized into a grinding chamber and allow it to accumulate therewithin while it is being pulverized. This invention contemplates passing the material directly into a pulverizing area in a continuous stream where it is acted on by grinding elements while passing through the pulverizing area. On leaving this pulverizing area, the entire stream of material is swept out of the grinding chamber with a current of air and the fines are removed only after the pulverized material has been so swept out.

Prior attempts at handling large quantities of pulverized materials have been relatively unsuccessful because it has been found impractical to efficiently separate the fines from the bulk of the material to be pulverized. To overcome this difficulty a new type of separator has been provided in accordance with the invention to handle the relatively great bulk of material in a continuous stream and at a very high velocity. In those cases in which a very fine, high quality finished material is desired, it has been found desirable, in accordance with the instant invention, to utilize a second separation step to further refine the finished product. Further, in accordance with the instant invention, provision has been made for the return of coarse materials from each of the separators or from each of the separation steps to the pulverized area in a uniform, continuous stream. It has been found that in the grinding of some materials, the coarse constituents leading from the separators or separation steps is of different quality from the whole material and that if the coarse material from the separators or separation steps were not returned at a uniform rate the finished product would not be of uniform quality. These difficulties, too, have been overcome by applcant's invention which operates rapidly, continuously and uniformly.

It is an object of the instant invention to teach a novel method of effecting high milling efficiency and efficient separation of the finished product.

It is a further object of the instant invention to provide a novel method of milling.

Other objects and the nature and advantages of the invention will be apparent from the following description taken in conjunction with the accompanying drawings, wherein:

Fig. 5 is a view in elevation of the separator incorporated in the mill assembly depicted in Figure 1;

Fig. 6 is a vertical sectional view with parts shown in elevation and parts broken away, the sectional portion taken along line A—A on Fig. 5 and looking in the direction of the arrows;

Fig. 7 is a top plan view of the separator shown in Fig. 5;

Fig. 8 is a vertical sectional view taken along line B—B of Fig. 7 and looking in the direction of the arrows.

Figure 1:
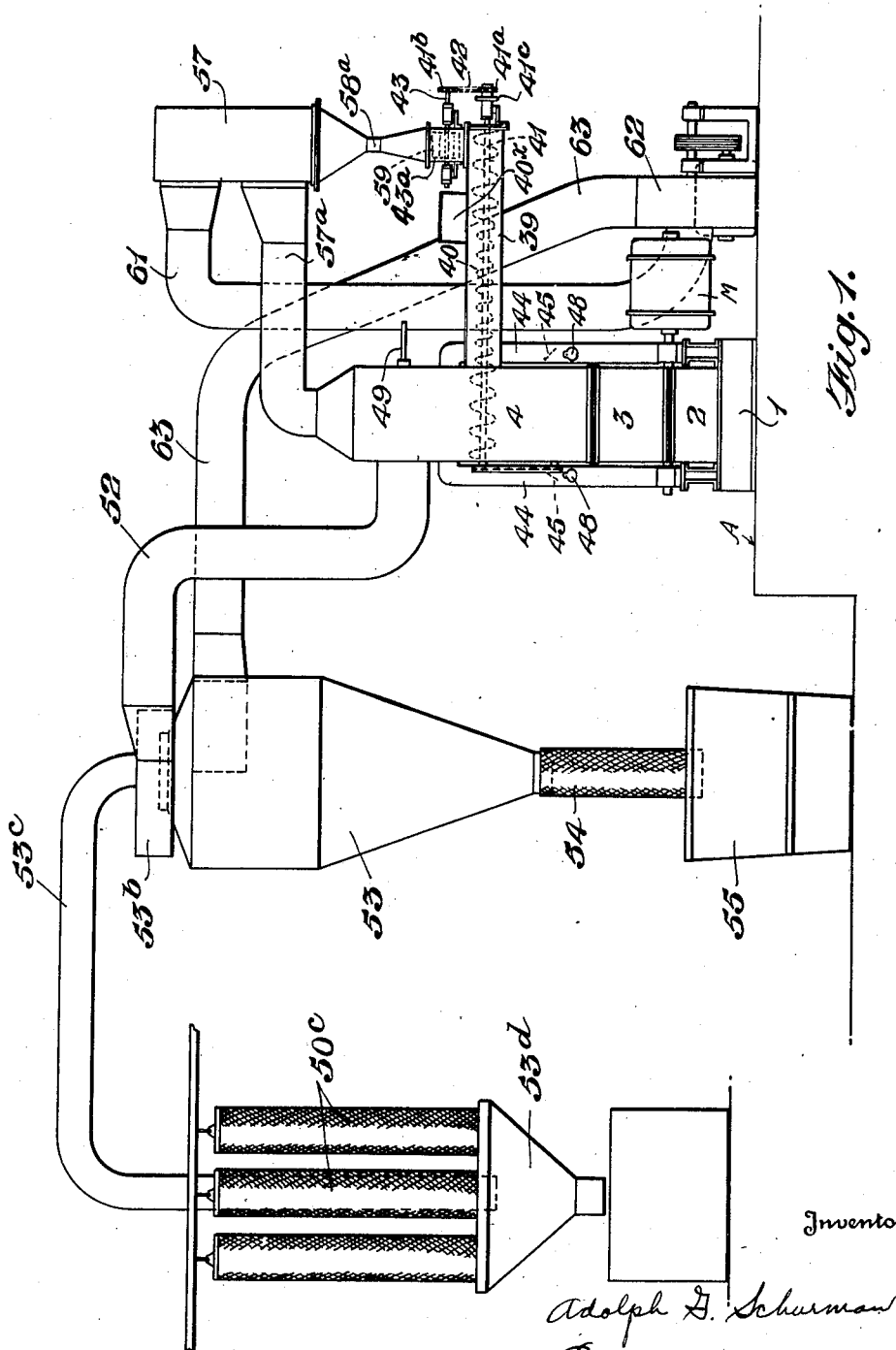
Figure 1 is a side elevation of a mill assembly in accordance with the invention.
Figure 2:
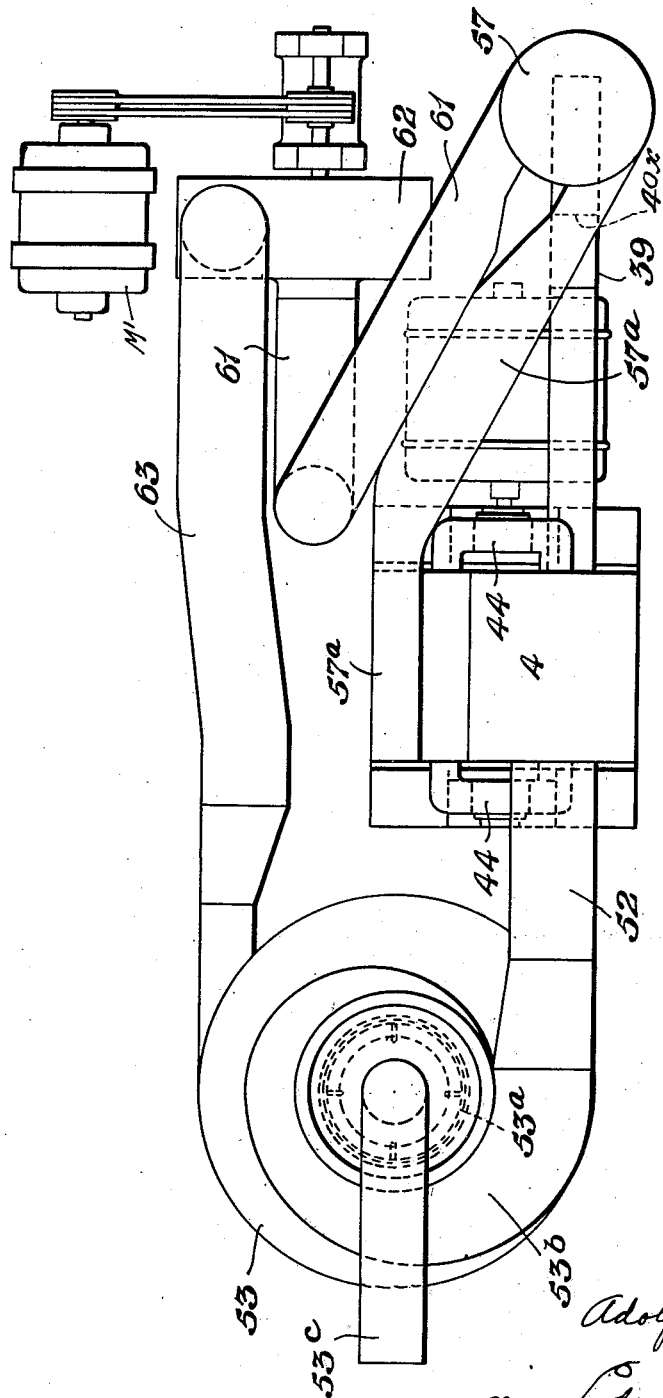
Fig. 2 is a top plan view of a portion of the assembly illustrated in Fig. 1.

Referring to the drawings, the reference letter "A" designates a base on which the beams 1 rest and support the mill to be described in detail later. The lower section 2 of one part of the mill structure may be secured to the beams 1 in any suitable manner, and the second and third sections of the mill, 3 and 4, respectively, are mounted on the section 2, said sections being suitably secured to each other by any suitable means such as the bolted angle irons 5, for example.

Figure 3:
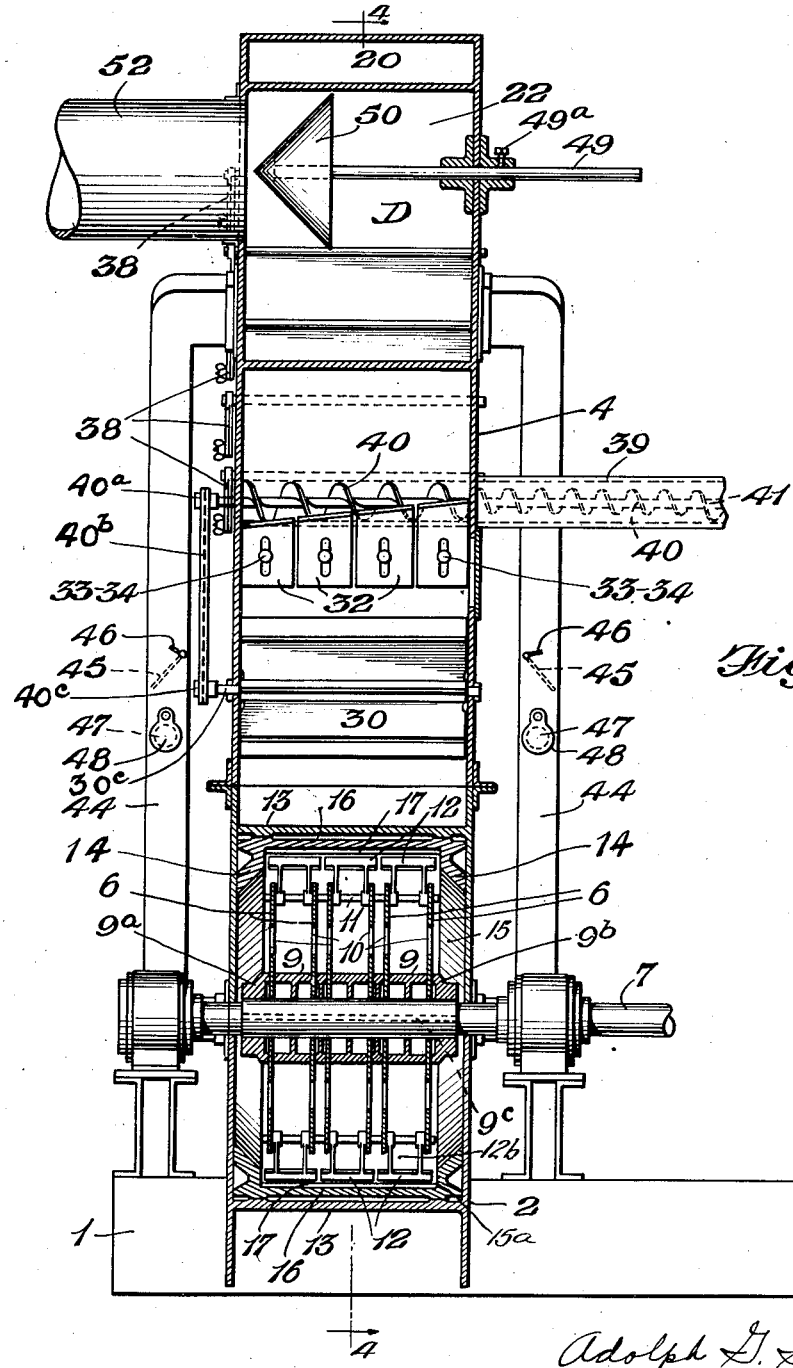
Fig. 3 is a vertical sectional view taken along line 3—3 of Fig. 4, depicting the grinding chamber and related parts.

Within the sections 2 and 3, the discs 6 are mounted on the suitably supported rotatable shaft 7 by means of the collar 9a, nut 9b, and key 9c; the spacing elements 9 on the shaft 7 serving to space the discs 6, as illustrated in Fig. 3.

The discs 6 are provided with air ports 10 which will be hereinafter referred to, and the said discs are connected adjacent their respective peripheries by means of the rods 11 to which are secured the beaters 12 in a manner so that they rotate with the discs 6 and the shaft 7, which is driven by the motor M.

Surrounding the discs 6 and the beaters 12 is a casing 13 within which is a wall composed of a number of segments 16. The inner peripheral faces of said segments may be composed of tooth-like projections 17, though they may be of any desired shape. These projections 17 cooperate with the beaters 12 to grind the material within the mill into a fine powder. At both sides of the segments 16, see Fig. 3, a filler 14 is located, the inner peripheral faces of which are beveled as at 15 and have straight vertical sections as at 15a.

Figure 4:
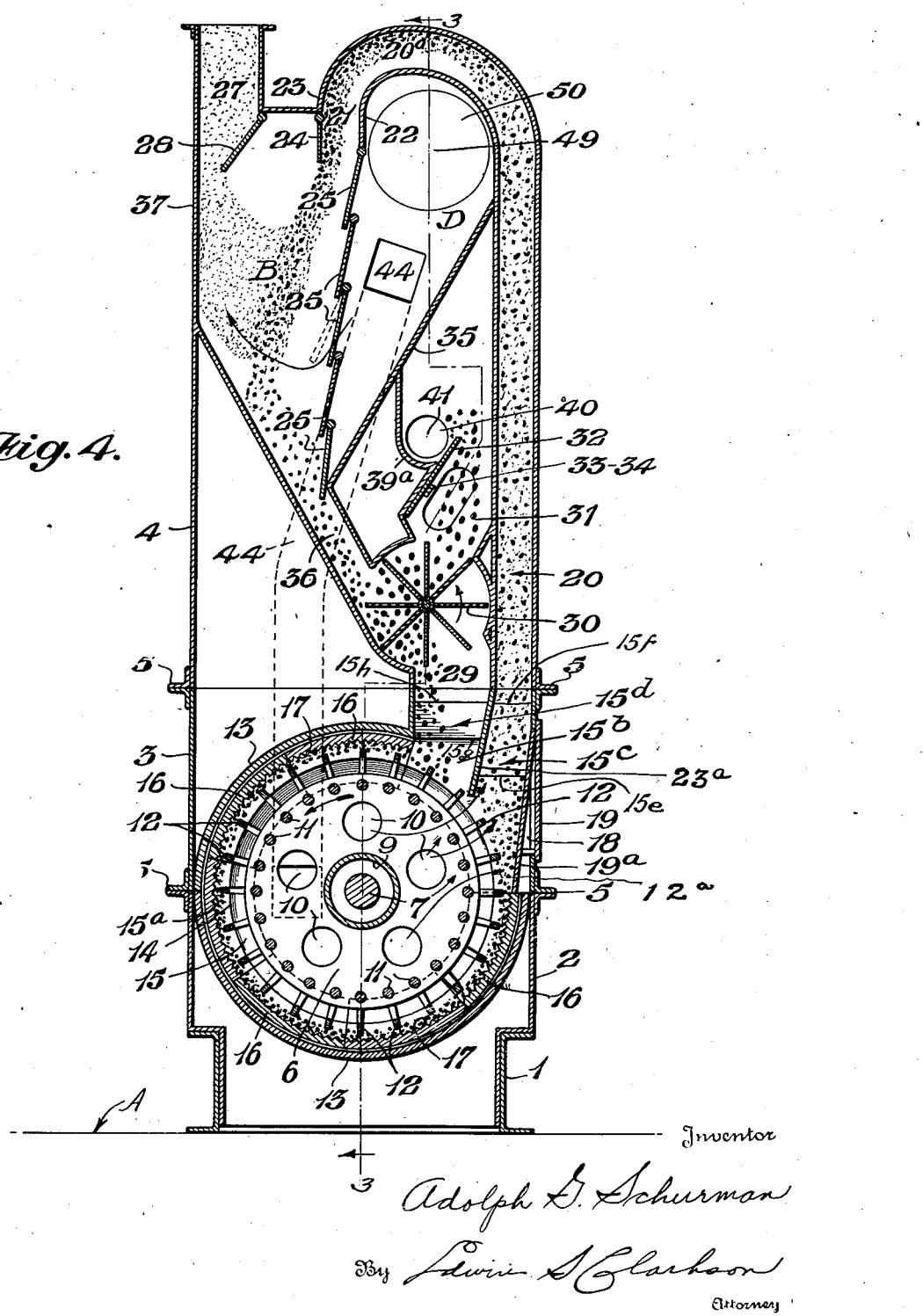
Fig. 4 is a vertical sectional view taken along the line 4—4 of Fig. 3.

These continuous inner peripheral faces 15 and 15a and the tooth-like projections 17, in cooperation with the closely spaced beaters 12, form a path between the inlet 29 and the outlet at the bottom of chute 20, see Fig. 4, for the material to be ground.

The air ports 10 and the discs 6 allow some of the air entering the grinding chamber through pipes 44 to flow through the discs 6 in order that air passing between the beaters 12 at 12a into the chute 20 will be uniform over the entire width of the outlet.

Wedge-shaped filler 15d, see Fig. 4, is in the same plane at 15g as the element 15a, but tapers to an edge at 15h to provide a smooth entrance for incoming material to be ground and cause all the material to fall directly on the beaters 12. Wedge-shaped filler 15c is in the same plane as the element 15a at 15e and tapers to an edge at 15f to provide a smooth entrance to the chute 20. Element 15b is in the same plane as element 15a and acts as a filler to make the inner peripheral faces substantially continuous.

One side of the casing 3 is provided with a doorway 18 and door 19, to which is secured a baffle 19a, the door and baffle being so constructed and related that they may be readily removed.

The chute 20 is positioned near one wall of the casings 3 and 4 and opens at its lower end into the compartment 12a housing the discs 6 and beaters 12. The lower end of one wall of the chute 20 is formed by the baffle 19a, see Fig. 4. The opposite wall 23a of the chute 20 extends down to the tips of the beaters 12 and acts as a baffle to guide material and air into chute 20.

The chute 20 extends upwardly and continues to the top of the casing or jacket 4, and then curves inwardly, as at 20a, toward the center of the casing or jacket 4, and then the chute 20 extends downwardly as at 21. A vane 24 may be pivotally mounted to the lower end of the chute wall 23 and vanes 25 may be pivotally mounted to the lower end of the chute wall 22. The vanes 25 are so constructed as to form a substantially solid partition when closed, the purpose of which will be hereinafter explained. As illustrated in Fig. 4, the chute 20 discharges into the separating chamber B.

Extending upwardly from the chamber B is an exit chute 27 provided at its bottom, at one side thereof, with a pivoted vane 28, which vane in cooperation with the wall 37, acts as an air control.

An inlet chute 29 is in communication with the grinding chamber, in which the discs 6 and beaters 12 are positioned, said chute having therein a rotor 30 composed of a plurality of vanes over which material delivered by worm 40 and chute 36 flows through chute 29 to the grinding chamber and beaters. Rotor 30 is provided in the organization in order to block air from entering chute 29 and to prevent the interchange of air between chutes 29 and 36 and chute 31, while permitting material to be ground which has been stripped of air to flow downwardly into the grinding chamber. Above the rotor 30 an inlet chute 31 is provided in which are slidably mounted a plurality of regulating plates 32 having elongated slots and thumb screws 33—34, whereby said plates may be fixed in adjusted positions so that material fed by the worm 40 is evenly and in the desired quantities fed over the entire width of the mill or grinding chamber. An inlet chute 36 leading from the chamber B into the chute 29 directs material that is to be reground from the chamber B to the grinding chamber.

A plate 35 separates the chamber D from the compartment containing worm 40 and chute 31. The ground material discharged from the upper end of the chute 20 is thrown by the air blast down into chamber B, the angle of the falling material being regulated by vane 24. The ground material and the air passing through the chute 20 and separating chamber B travels at very high velocity in order to effect the desired separation. The coarse material is thrown down into the channel 36 and returned to the grinding chamber, while the fine material and air passes upwardly through the chute 27. It is to be noted that plate 37 forms one wall of the chamber B. The vanes 24, 25 and 28 are designed to be operated manually by the levers 38 to the desired adjusted position.

A suitable conveyor tube 39 extends into the casing 4, and within this tube is a conveyor screw or worm 40 which is preferably, although not necessarily, of two diameters, the larger diameter extending a predetermined distance from the outer end of the worm, said worm being positioned in a trough 39a within the casing. This worm feeds material onto the plates 32 from which it passes into the chutes 29 and 31. The shaft 41 of the worm 40 is provided at one end with a sprocket wheel 41a on which is mounted a drive chain 42, said chain being also mounted on a sprocket 41b which is fixed to the shaft 43 of the vaned rotor 43a. On the opposite end of the shaft 41 is a sprocket 40a which in cooperation with the chain 40b and sprocket 40c drives shaft 30c of rotor 30. Shaft 41 is driven through sprocket 41c preferably from a source which has a variable speed.

The upper ends of the down draft pipes 44 open into the casing between the vanes 25 and partitions 35, while their lower ends open into the grinding chamber, as indicated in Fig. 4. These ducts are each provided with vanes, or valves 45 which have an operating arm 46 and may be set in any adjusted position. Air inlet openings 47 are provided in the ducts 44 which are controlled by their covers 48 which in turn are adapted to be fixed in adjusted positions.

The chamber D is formed below the upper bend of the chute 20 in which is journaled the shaft 49 on which is mounted the air control 50 which may be operated and adjusted from the outside by means of the shaft 49 and held in adjusted position by the set screw 49a. This chamber D is in communication with the return air duct 52 leading from the cyclone 53. A part, or all, as desired, of the air from the chamber D passes through either the ducts 44, or vanes 25, the flow of air through either of the ducts 44 being controlled by the valves 45.

Valve 50 may be moved to closed position by operating rod 49, thereby completely closing the opening into the pipe 52, then all the air taken in will enter through inlets 47. In addition, valve 50 may be opened and air inlets 47 closed whereby no air will be taken in and the mill operated as a closed unit continuously recirculating the same air.

The construction of the rotor 30 and the casing around it is such that air is blocked from passing between the grinding chamber, separating chamber, and the feeder. The rotor 30 is composed of a series of vanes, which in cooperation with the curved sections thereabout, form an air lock in the grinding chamber inlet for stripping the material passing through the air lock of air. Each curved section fits closely about the outer edge of the individual vanes and the arc of each section is of sufficient length to close the space between the tips of any two vanes, so that no air will pass regardless of the position of the vanes. The construction described involves the cooperation of two vanes with a curved section to form an air lock pocket which prevents air from accompanying material from the feeder or the separator into the grinding chamber.

Material to be pulverized enters through bin 40x and is carried by screw 41 over plates 32 which are adjusted to distribute the material uniformly over the entire width of inlet 31 onto the rotor 30, which turns counter-clockwise as viewed in Fig. 4. As the rotor 30 turns, coarse material from chamber B coming down chute 36 is mixed with fresh material already in rotor 30, then the mixture is passed into inlet 29 directly on to the rapidly revolving beaters, which carry it into the beating area formed by lining segments 16 and revolving beaters 12. The material follows this channel until the bottom of chute 20 is reached at 12a, when it is thrown into chute 20.

The beaters 12 are so closely spaced in relation to each other and the projections 17 that substantially no material entering the beating area between them can get out, for when a beater hits the material and drives it against the projections 17, it will rebound toward the beaters; but before it can rebound far enough to get behind the head of the beaters in the space 12b, it will be hit by another beater and driven back against the projections 17, consequently the material will have to follow the beating area formed by the projections 17 and the rapidly revolving beaters. The faces 15a keep the material in this beating area from moving sidewise and escaping from between the beaters. The fact that the material is crowded into this beating area tends to crowd out the air so that the material cannot become suspended in the air.

Air coming down pipes 44 enters the grinding chamber and is uniformly distributed between the discs as well as on each side of the rotor. Due to the close spacing of the beaters in relation to each other, air between the members 14 moves with the beaters and will not to any great extent form eddy currents at their trailing edges, which would tend to carry the material being ground out of the beating area formed by the projections 17 and the revolving beaters 12, into the space 12b.

Should the material enter the space 12b, the beaters could not satisfactorily act thereon for the material would be suspended in the air therein. When the beaters are too widely spaced or the material is moved through the grinding chamber by the air so as to suspend the material in the air, then as the beaters revolve the material is blown from in between them by the air before they can appreciably act upon the particles of material being ground.

Baffle 23a extends to the tip of beaters 12 so that material leaving the beaters is guided up into chute 20. The beaters 12 throw the material off at a tangent directly into the chute 20; the air flowing outwardly between the beaters 12 at 12a, assists in carrying the material up into chute 20 and both the material and the air move upwardly through the chute 20 and then into the separating chamber B. It is to be noted that no movement of air or material upwardly through chute 29 can take place because of the air lock rotor 30. The air has a definite path through pipes 44 into the grinding chamber and out through the beaters 12 at 12a; while the material has an independent path between the projections 17 and the beaters 12. However, both the ground material and air discharge into a common outlet.

The ground material and air moving up chute 20 and around the curve 20a are separated into indistinct layers, by the action of centrifugal force, with the coarse material at the outermost circumference and the air at the innermost circumference. The ground material and air are then thrown into separating chamber B, past vane 24 which is set at such an angle so as not to disturb the indistinct layers of ground material and air.

Due to the velocity of the entering material and air and the spacing of the inlet and outlet in relation to each other, the fine material and air, which must reverse itself and move through the outlet 27, will have moved below the vane 24 before it can reverse itself, and as the outlet 27 is spaced some distance from the inlet 21, the fine material and air will have reversed itself before reaching the lower edge of the vane 28. The fine material and air are reversed some distance below the vanes 24 and 28.

In operation, there will be a stream of material and air from the inlet 21 into the chamber B, across its entire width, past the vane 24, and a stream of fine material and air moving out of the chamber B through the outlet 27, past vane 28. As the air is made to reverse itself, the fine material entrained in it will be carried out of the chamber B. The coarse material indistinctly separated in the rebent portion of chute 20 then moves through the reversing fine material and air and into the chute 36, as shown in Fig. 4.

Should the air coming into the chamber B through chute 20 be insufficient to carry out all the fine material, vanes 25 may be opened to admit additional air from distributing chamber D, so the air will have sufficient force to reverse all the particles which are sufficiently fine and move them out through the outlet 27.

The wall in which the vanes 25 are located, the rotor 30, and the wall 37, form an enclosure which prevents the air and fine material from moving out of the chamber B except through the outlet 27. The pressure in chamber B is arranged to be less than the pressure in chamber D, and the pressure in the outlet 27 is less than in chamber B, due to the action of the fan 62, and the pressure is controlled by valve 50 and the vane 28 in cooperation with wall 37. Valve 50 can be regulated so that the distributing chamber D, the separating chamber B, and the grinding chamber are below atmospheric pressure in order that dust or fumes will be prevented from escaping except through the outlet 27. The separation can also be controlled by regulating the volume of air passing through chamber B by adjusting the vanes 45 or cover 48 or both. In addition vane 28 may be used to assist in controlling the air and vanes 25 may be opened to add more air should the force of the air moving up chute 20 be insufficient to force fine particles into outlet 27. While in the construction shown the valve 50 and vane 28 may be utilized to control passage of air, it is to be understod that it is in accordance with the invention to entirely control the passage of air by adjusting the covers 48 and valves 45. The air circulation up chute 20 and through chamber B is effected by the action of the beaters 12 assisted by the suction of the fan 62, driven by motor M'. This suction also indirectly causes air to enter between the vanes 25 when they are opened.

It should be noted that the separation takes place in that part of the chamber where there are no partitions and there are no obstructions within the area where this separation takes place.

The construction of the casing around the rotor 30, separates the feeder, grinding chamber and the separating chamber into independent units as far as the movement of air is concerned. The material is discharged from the feeder into the rotor 30 independent of the oversize material which is discharged from the separator and the combined material is discharged into the grinding chamber by the rotor.

The air and fine material from chamber B are passed into a separator 57, the fine material and air being again separated and the coarse material being discharged through the vaned rotor 43a. This allows material to pass into worm 41, partially filling the worm which carries the coarse material toward the mill body until bin connection 40x is reached, where the screw conveyor is further filled with a raw material.

The fine material and air are drawn out of the separator 57 through duct 61, by fan 62, thence passes through and into cyclone 53, and is discharged into a suitable container or sent to storage. The air being relieved of material moves upwardly, part being collected by a hood 53b and returned through the duct 52 to air-distributing chamber D. Excess air that enters through holes 47 in pipes 44 and any leakage that may enter the mill passes eventually into duct 53c and into cloth filters 50c which trap any material that may be entrained.

Vanes 45 and covers 48 are opened until sufficient air is allowed to pass into grinding chamber to carry all the material passing between grinding segments 16 and beaters 12 through chute 20 and into chamber B.

In very fine pulverizing work, the bulk of material to be handled is so large that to separate the fines from so large a mass is impractical in one separation. The first separation in chamber B separates all the very coarse material from the fine and the near fine. The fines and the near fines are carried up chute 20 by the air (should additional air be needed to carry all the fine material into separators 57, vanes 25 may be opened) through duct 57a, into separator 57.

By partially closing valve 50 and opening air control 28, the mill proper will be operated below atmospheric pressure. This is an advantage when grinding poisonous material.

It should be noted that the air can enter the grinding chamber only through the pipes 44, and under the influence of the suction effect of the fan 62 the air is drawn through the holes 10 in discs 6 and passes through the spaces between the beaters when they register with the oulet 12a at the bottom of the chute 20 so that air may carry the beaten material upwardly through the said chute 20. As the beaters progress to the air blocked inlet 29 the beaters receive additional material to be ground or beaten and said material is carried between beaters 12 and tooth-like projections 17 until the location 12a is again reached, whereupon the material and air, as already described, is again projected upwardly into the chute 20. Thus the material is acted on by the beaters without interference with the rapidly moving air which is only utilized in contact with the ground or beaten material after the beating or grinding action has already taken place. As set forth above, the air and material passing upwardly through the chute 20 and into the separator B travels at a very high velocity.

Referring to Figs. 6, 7, and 8, the generally cylindrical separator 57 comprises an inlet section 57b and a separator section 57c. The ring or annular disc 58 of generally frusto-conical configuration forms a baffle or ledge which extends downwardly and inwardly from the inner circumference at the bottom of the cylindrical separator 57.

The ring or annular disc 60 is generally flat and forms a baffle or ledge which extends about the inner circumference of the separator 57 adjacent its top.

The inlet conduit 66 may be of rectangular section and arranged to discharge tangentially into the separator 57 directly on the ledge 58. The construction shown in the drawings serves to introduce the material and air into the separator 57 in a thin stream parallel to the vertical inner side of the separator 57 and on the ledge 58.

The lower wall of the inlet duct 57a, reformer 66a and inlet conduit 66 are in a straight line so that entering material will pass to within the separator 57 in a straight line. The reformer 66a serves to reform the stream of air and material for in the construction the duct 57a is circular in cross section and the inlet conduit 66 is rectangular in cross section.

The outlet conduit 61a, leading from the separator 57, is also of rectangular cross section and is connected to a reformer 61b which in turn is connected to the duct 61 which is of circular cross section. The top section 61c of the separator 57, in which the outlet conduit 61a comprises a cylindrical element closed at its top end, provides a casing which serves to collect fine material and allow spilling over the edge of the separating ledge 60.

Located at the bottom of the separator 57 is the frusto-conical shaped element 65, the walls of the element 65 tapering downwardly and inwardly and meeting the collar-shaped outlet element 58a. The element 65 is fastened to the separator 57 below the ledge 58 and serves to collect the coarse material spilling out of the separator 57 and guide it into the revolving vane 59. The rotor 43a is driven by the shaft 43 and sprocket 41b which in turn may be driven by any suitable means.

The air and material may be induced to flow through the separator 57 by the suction fan 62.

The air and material entering the separator 57 in a direction tangential thereto forms a whirling body of air and material, as shown in Fig. 8, which whirling body is supported by the ledge 58. The material being heavy in relation to the air is more readily influenced by the action of centrifugal force created by the rapidly whirling motion and will move to the outer circumference of the whirling body adjacent the inner vertical wall of the cylindrical separator 57 to form a cylindrical mass of whirling material. The inner circumference of the mass of whirling material will approximately correspond to the inner edges of the ledges 58 and 60 as shown in Figure 8.

The incoming material being discharged on the ledge 58 is temporarily supported by this ledge and tends to keep from falling over the inner edge of this ledge because of the action of centrifugal force induced by the rapidly revolving mass, and the material moves up along the inner walls of the separator 57 into the section 57c. The coarse material moves to the outermost circumference of the whirling mass and into the separator 57, the fine material being light and more readily acted on by the air, moves to the inner circumference of the air and material. The space between the ledges 58 and 60 being filled with the whirling mass of material, the fine material and air will spill over the edge of the ledge 60 into the collecting chamber 61c and the air will carry the fine material out of the collecting chamber through the outlet conduit 61a.

The coarse material being held adjacent the inner wall of the separator 57 by the whirling motion of the revolving mass will tend not to spill over the edge of the separating ledge 60. However, the air can hold only a limited quantity of this coarse material under the conditions set forth and the coarse material being relatively heavy and not as readily influenced by the air movement, will move downwardly along the inner wall of the separator 57 and spill over the ledge 58 whereupon it will be collected by the frusto-conical shaped element 65 and move through the collar-shaped outlet 58a. The disc 58, Figure 6, supports the body of whirling material and may be held in position by compression and easily changed to regulate the size of revolving cone and material and air. Disc 60 may be held by compression between angles 60a—60a and may be easily changed to regulate the fineness of material.

It will be obvious to those skilled in the art that various changes may be made in this device without departing from the spirit of the invention and therefore the invention is not limited to what is shown in the drawings and described in the specification but only as indicated in the appended claims.

What I claim is:

1. The method of pulverizing material comprising: continuously feeding material to be pulverized to a beating area defined by a path formed on one side by the locus of beating contacts with material being beaten and on the other side by a rebound wall, stripping the material being fed to said beating area of air, maintaining the material in an air stripped condition and simultaneously beating the material against said wall, permitting the material to rebound from said wall and applying successive beater blows with such rapidity as to keep the material in continuous motion to and from said wall and within the beating area, moving the material along said wall by beater action, continuously discharging the beaten material from said beating area.

2. The method recited in claim 1, and utilizing a current of air to carry said beaten material from said beaten area and preventing the air borne material from reentering the beating area.

3. The method of pulverizing material comprising: continuously feeding material to be pulverized to a beating area, continuously stripping the material being fed to said beating area of air, maintaining the material in an air stripped condition and simultaneously beating the material against a continuous stationary wall, permitting the material to rebound from said wall and applying successive beating blows with such rapidity as to keep the material in continuous motion to and from the wall and within the beating area, moving the material along the wall by said beater action, and then utilizing a pulsating current of air to remove the beaten material from the end of the beating area while beating is taking place in said beating area of further material to be pulverized.

4. The method of pulverizing and separating material comprising: pulverizing material into fine and coarse particles, utilizing a current of air to carry the pulverized material, forming the pulverizing material and air into indistinct layers of air and material, maintaining the formation of indistinct layers of air and material and passing said formation into an unobstructed separating area, reversing the air and fine particles, and passing the fine particles and air through the coarse particles within the unobstructed separating area and then passing the fine particles and air out of the unobstructed separating area, passing the coarse particles across the unobstructed separating area and out of the unobstructed separating area.

5. The method recited in claim 4, and admitting additional air to the unobstructed separating area at one side of said indistinct layers and effecting its passage transversely thereof to aid in separating the fine particles from the coarse paritcles, the additional air being added to the air and fine particles, and effecting the passage of the additional air out of the unobstructed separating area with the fine particles and air.

6. The method of pulverizing material comprising: continuously feeding material to be pulverized to a beating area, stripping the material being fed to said beating area of air, maintaining the material in an air stripped condition and simultaneously beating the material against a continuous stationary wall, permitting the material to rebound from said wall and applying successive beating blows with such rapidity as to keep the material in continuous motion to and from the wall and within the beating area, moving the material along the wall by said beater action, and then utilizing a current of air to remove the beaten material from the end of the beating area while beating is taking place in said beating area of further material to be pulverized, passing the air current laden with beaten material through a U-shaped path to separate the beaten material and air into indistinct layers, reversing the air and finely beaten material in an unobstructed separating area and separating the coarse material from the air and finely beaten material, discharging the finely beaten material and air from the unobstructed area, discharging the coarse material from the unobstructed area, mixing said coarse material with additional material to be pulverized and repeating the steps already cited.

7. The method of pulverizing material comprising: continuously feeding material to be pulverized to a beating area, stripping the material being fed to said beating area of air, maintaining the material in an air stripped condition and simultaneously beating the material against a continuous stationary wall, permitting the material to rebound from said wall and applying successive beating blows with such rapidity as to keep the material in continuous motion to and from the wall and within the beating area, moving the material along the wall by said beater action, and then utilizing a current of air to remove the beaten material from the end of the beating area while beating is taking place in said beating area of further material to be pulverized, separating the coarse particles from the fine particles in the beaten material, mixing the said coarse particles with additional material to be pulverized, and repeating the steps already recited, passing the fine particles in an air current to a second separating area and passing it into the base of a rapidly whirling cylindrical mass, retaining the fine particles within the whirling cylindrical mass until the most finely beaten material is separated from the relatively coarse material, spilling the most finely beaten material and air out of the whirling cylindrical mass and passing the most finely beaten material and air out of the separating area, spilling the relatively coarse material out of the inner circumference of the whirling cylindrical mass, passing the coarse material out of the separating area, passing the coarse material back to the beating area and adding raw material to said coarse material on its way to the beating area.

8. The method of pulverizing material comprising: continuously feeding material to be pulverized to a beating area, stripping the material being fed to said beating area of air, maintaining the material in an air stripped condition and simultaneously beating the material against a continuous stationary wall, permitting the material to rebound from said wall and applying successive beating blows with such rapidity as to keep the material in continuous motion to and from the wall and within the beating area, moving the material along the wall by said beater action, and then utilizing a current of air to remove the beaten material from the end of the beating area while beating is taking place in said beating area of further material to be pulverized, forming the air current laden with beaten material into indistinct layers, reversing the air and finely beaten material and air in an unobstructed separating area and separating the coarse material from the air and finely beaten material, discharging the air and finely beaten material from the unobstructed separating area, discharging the coarse material from the unobstructed separating area, stripping the coarse material of air and returning it to the beating area, passing the finely beaten material and air to a second separating area and forming it into a rapidly cylindrically whirling mass, discharging the finely beaten material and air into the base of the cylindrically whirling mass, retaining the finely beaten material within the cylindrically whirling mass until the most finely beaten material is separated from the relatively coarse material, spilling the most finely beaten material and air from the cylindrically whirling mass and passing it out of the separating area, spilling the relatively coarse material from the inner circumference of the base of the cylindrically whirling mass, passing the coarse material out of the separating area, passing the coarse material back to the beating area and adding raw material to said coarse material on its wy to the beating area.

9. The method comprising: pulverizing material, utilizing a current of air to carry the material, forming the material and air into a hollow cylindrical whirling mass, confining said whirling mass at its top and bottom within annuluses having an outer diameter and an inner diameter, feeding material and air tangentially into the base of said whirling mass directly over the bottom annulus thereof, effecting the upward passage through said whirling mass of air and fine material, spilling fine material and air upwardly and over the inner circumference of the upper annulus of said whirling mass, spilling coarse material downwardly over the inner circumference of the bottom annulus of said whirling mass.

ADOLPH G. SCHURMAN.